Dec. 17, 1963   R. C. FINVOLD   3,114,520
STABILIZATION AND CONTROL SYSTEM FOR PILOTLESS, VERTICAL
TAKE-OFF AND LANDING AIRCRAFT
Filed Jan. 16, 1961   2 Sheets-Sheet 1

*INVENTOR.*
RODGER C. FINVOLD
BY
*Knox & Knox*

Dec. 17, 1963 R. C. FINVOLD 3,114,520
STABILIZATION AND CONTROL SYSTEM FOR PILOTLESS, VERTICAL
TAKE-OFF AND LANDING AIRCRAFT
Filed Jan. 16, 1961 2 Sheets-Sheet 2

INVENTOR.
RODGER C. FINVOLD
BY Knox & Knox

United States Patent Office 3,114,520
Patented Dec. 17, 1963

3,114,520
STABILIZATION AND CONTROL SYSTEM FOR PILOTLESS, VERTICAL TAKE-OFF AND LANDING AIRCRAFT
Rodger C. Finvold, San Diego, Calif., assignor to The Ryan Aeronautical Co., San Diego, Calif.
Filed Jan. 16, 1961, Ser. No. 82,829
1 Claim. (Cl. 244—75)

The present invention relates generally to aircraft and more particularly to a stabilization and control system for pilotless, vertical take-off and landing aircraft.

Pilotless or drone aircraft are used for various purposes, such as gunnery targets, reconnaissance and similar missions where the hazards involved may be more than desirable for a piloted aircraft. Present methods of launching drones include air launching from beneath a larger, piloted aircraft, or conventional type of take-off, both of which require an airfield for operation. Alternatively the drone can be catapulted or launched from guide rails by rocket assistance. Most drones are intended to be recovered by remote controlled landing or, as is commonly practiced, by means of a parachute carried by the drone. Damage is frequent and often the drone descends in a relatively inaccessible area, making recovery difficult. For military use especially, a highly mobile launching means is necessary, together with accurate control of landing in a limited and usually unprepared area.

Vertical take-off and landing techniques have been developed in which an aircraft is suspended by a hook from a cable supported above the ground, the aircraft being lifted off in vertical attitude entirely by engine thrust, then accelerated to flying speed and flown through transition to level flight. In landing, the aircraft's speed is reduced to substantially zero and the aircraft hovered in a vertical attitude, finally being lowered to engage the cable. This and the tail sitter type of aircraft, which stands upright on reinforced tail structure, have been tested and found practical. In pure jet aircraft, aerodynamic control surfaces are ineffective during hovering or very low speed flight and jet reaction must be used for control. In one type of aircraft this has been accomplished by a movable nozzle on the primary jet engine, but on small and necessarily inexpensive drones, this arrangement becomes impractical and a simplified system is desirable.

The primary object of this invention, therefore, is to provide a stabilization and control system primarily applicable to pilotless aircraft which take off and land in a vertical attitude, the system utilizing jet reaction directional control means during the low speed and hovering flight phases during which aerodynamic surfaces are ineffective.

Another object of this invention is to provide a control system in which the jet reaction controls are coupled to the aerodynamic surfaces to operate in conjunction therewith by a common actuating mechanism, so eliminating duplication of controls.

Another object of this invention is to provide a control system in which the jet reaction means are coupled to have a proportionately greater range of movement than the aerodynamic surfaces which are inherently more effective when in operation.

A further object of this invention is to provide a control system which provides full orientation and attitude control of the aircraft without the need for deflecting the primary jet engine exhaust.

Finally, it is an object to provide a stabilization and control system of the aforementioned character which is simple and convenient to install and operate.

With these and other objects definitely in view, this invention consists in the novel construction, combination and arrangement of elements and portions, as will be hereinafter fully described in the specification, particularly pointed out in the claim, and illustrated in the drawings which form a material part of this disclosure, and in which:

Similar characters of reference indicate similar or identical elements and portions throughout the specification and throughout the views of the drawing.

Figure 1:
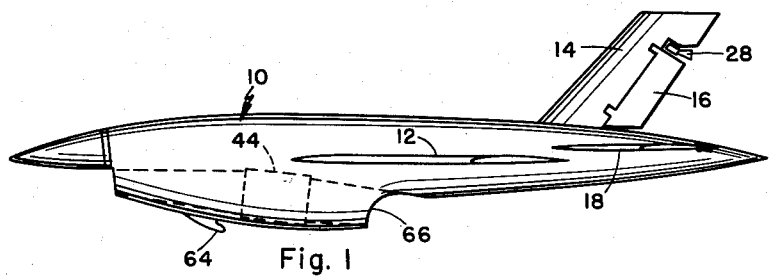
FIGURE 1 is a side elevation view of a drone aircraft incorporating the system.
Figure 2:
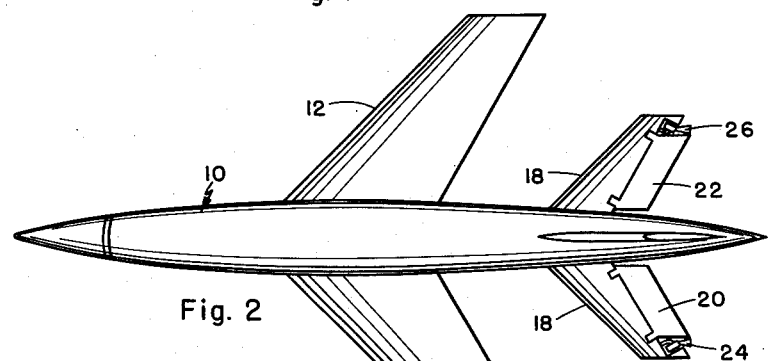
FIGURE 2 is a top plan view of the aircraft.
Figure 3:
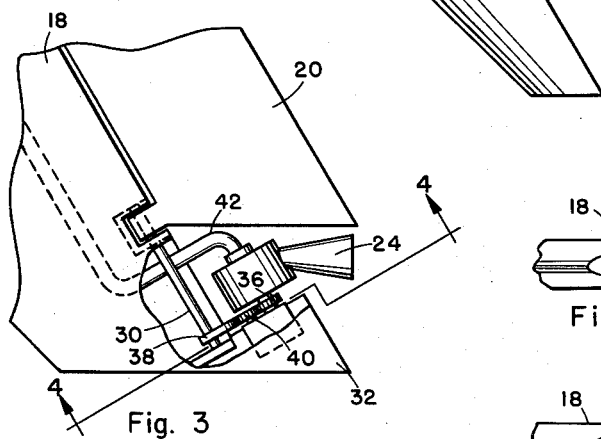
FIGURE 3 is an enlarged fragmentary plan view of the top portion of one aerodynamic surface, showing the reaction control means.
Figure 4:
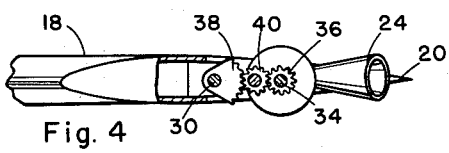
FIGURE 4 is a sectional view taken on the line 4—4 of FIGURE 3.

The drone aircraft 10 is typical of present types and has a wing 12, a fin 14 with a movable rudder 16 and a horizontal stabilizer 18, also with movable control surfaces. While the control system described herein is adaptable to the well known arrangement using wing mounted ailerons, the system has been simplified by making the stabilizer control surfaces dual purpose to function in the manner of elevons, indicated at 20 and 22. Thus pitch and roll control are obtained without the necessity for any mechanism in the wing, at a considerable reduction in weight and cost.

At the outboard end of each elevon 20 and 22 and at the upper end of the rudder 16 are jet reaction nozzles 24, 26 and 28, respectively. Since the arrangement and operation of the nozzles is similar in each instance, the structure will be described in relation to the elevon 20 and is applicable to the other elevon 22 and rudder 16.

Figure 5:
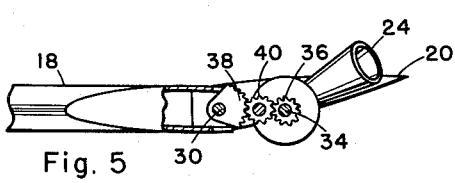
FIGURE 5 is a sectional view similar to FIGURE 4, showing the controls offset.

The elevon 20 is pivotally mounted on suitable hinges and has an extended outboard hinge pin 30. The stabilizer 18 has a fixed tip portion 32 on which the nozzle 24 is pivotally mounted on a shaft 34 parallel to the hinge pin 30 and fixed to said shaft is an actuating gear 36. Secured to the hinge pin 30 is a sector gear 38, while mounted between and interconnecting said sector gear and the actuating gear 36 is an idler gear 40. Thus any angular motion of the elevon 20 causes rotation of the sector gear 38, which turns the nozzle 24 in the same direction as the elevon, the aerodynamic and jet reactions being complementary. Since an aerodynamic surface, when properly operable, is more effective than a jet reaction force, it is necessary to deflect the nozzle substantially more than the elevon, as in FIGURE 5, and this is easily accomplished by making the sector gear 38 of greater radius than the actuating gear 36, the actual ratio being dependent on various factors, such as nozzle size and control surface area. The control arrangement illustrated is merely an example of a practical means for interconnecting aerodynamic and reaction controls and other means such as electrical or hydraulic systems may be used, according to available services in the drone and to suit the particular structure.

In the complete system, the three nozzles 24, 26 and 28 are supplied with pressurized gas through conduits 42 leading from the turbojet engine 44. The gas may be air taken from the compressor stage, hot gases from the combustion or exhaust stage, or may be obtained from an independent source. In neutral position the nozzles eject gases substantially parallel to the primary exhaust gases and contribute to thrust without any deviation.

Figure 6:
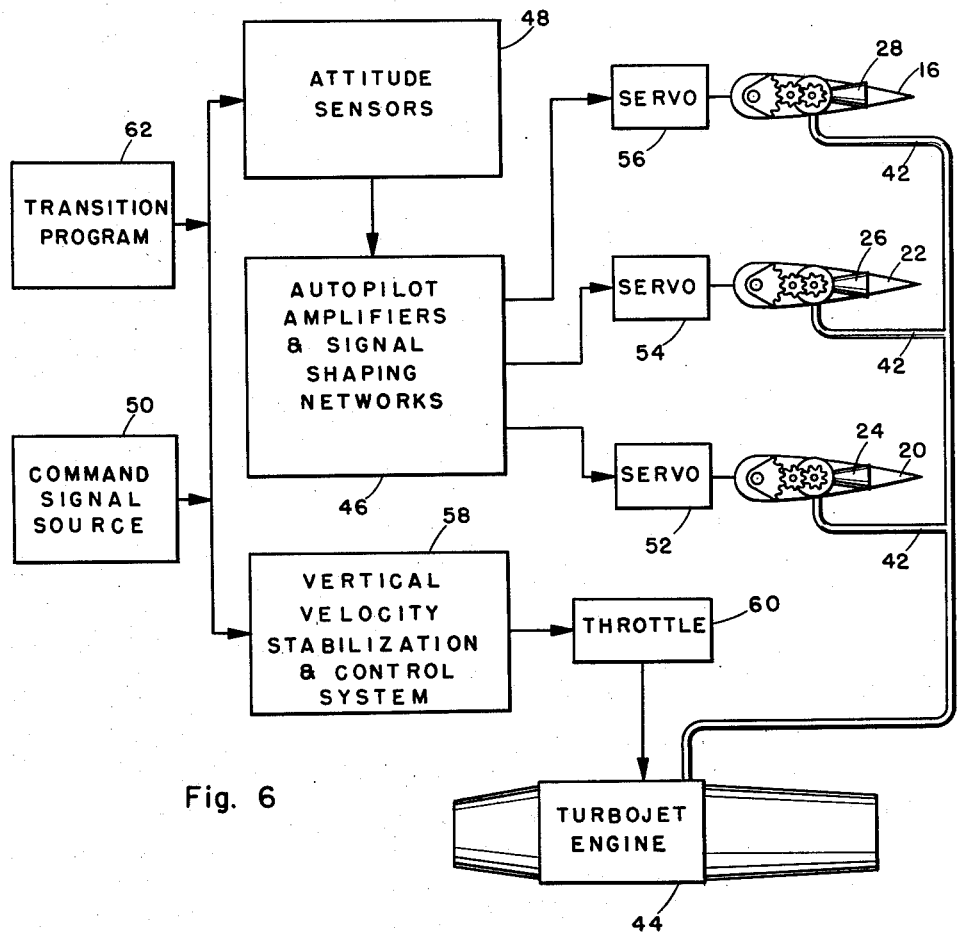
FIGURE 6 is a diagrammatic representation of the complete system.

Most drones are equipped with some type of autopilot, as indicated at 46 in FIGURE 6, the autopilot being controlled by attitude sensors 48, such as gyros, accelerometers and the like, or by remote control from a command signal source 50 using radio equipment. The autopilot 46 provides output signals which operate servos 52, 54 and 56 coupled to the elevons 20 and 22 and the rudder 16, respectively, the system and type of equipment used being well known and subject to considerable variation. Since the drone is intended for vertical take-off and landing a vertical velocity stabilization and control system 58 is coupled to the engine throttle control 60 and is operated by the command signal source 50, the system providing precise engine thrust control for hovering, climb and descent. A suitable system is fully described in U.S. Patent No. 2,844,338, issued July 22, 1958 to Ivan W. Keith and entitled Vertical Velocity Thrust Control for Hovering V.T.O. Aircraft.

For automatic operation in vertical take-off and landing a transition program unit 62 may be coupled to the attitude sensors 48 and to the vertical velocity stabilization and control system 58. The transition program unit 62 contains a magnetic tape or similar medium on which is impressed a program of control sequences which are applied to the control system to fly the drone from vertical lift-off, through a transition phase to level flight and back from level flight to a vertical landing maneuver. Such program devices are well known in the art and can be set up to perform elaborate sequences of operations.

In a typical flight, the drone is suspended by a hook 64 from a support cable or the like, not shown, and the engine thrust is increased until the drone lifts clear of its support. In the vertical attitude, with no appreciable slip-stream to make the aerodynamic surfaces effective, the drone is stabilized by thrust from the reaction nozzles 24, 26 and 28, controlled by the autopilot which senses any deviations from the desired attitude. With a further increase in thrust the drone is climbed to a suitable altitude and accelerated to a speed at which aerodynamic lift becomes effective. The nozzles 24 and 26 are then deflected downwardly, relative to the drone's thrust line, to pitch the drone forwardly into level flight. In normal flight the gas supply to the nozzles can be shut off or, to simplify control mechanisms, may be left on to operate in conjunction with the aerodynamic surfaces. Landing is accomplished by reversing the sequence, the nose being pitched up to lose forward speed and the drone lowered in vertical attitude by decreasing thrust.

Since the reaction nozzles provide full directional control, it is unnecessary to deflect the primary engine exhaust stream by means of a large, heavy nozzle. In the configuration of the drone aircraft 10 as illustrated, the engine exhaust outlet 66 is near the center of gravity and control reaction of the exhaust stream would be ineffective, as in other types of drones having forwardly mounted engines. The system is also applicable to drones of the tail sitter type which stand in vertical attitude on a reinforced tail or special landing gear, only a very small prepared surface being necessary and the supporting cable being eliminated. For military purposes, the tactical advantages of a drone aircraft which can operate from a virtually unprepared site are obvious.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

In a turbojet powered aircraft capable of taking off and landing in a vertical attitude: the combination of aerodynamic control surfaces, and auxiliary jet reaction control means coupled to said aerodynamic surfaces to operate simultaneously therewith; said aerodynamic surfaces being pivotally mounted on the aircraft; said jet reaction means including a nozzle pivotally mounted adjacent the outer end of each of said aerodynamic surfaces and being movable to provide a reactive force in a common direction with that of the respective aerodynamic surface; proportional actuating means interconnecting said aerodynamic surfaces and said nozzles to swing the nozzles through substantially greater angles of deflection than the aerodynamic surfaces; means to actuate said aerodynamic surfaces and said nozzles in response to deviations of the aircraft from a predetermined attitude; and a source of compressed gas connected to said nozzles.

References Cited in the file of this patent

UNITED STATES PATENTS

| 2,621,871 | Robert | Dec. 16, 1952 |
| 2,762,584 | Price | Sept. 11, 1956 |
| 2,988,301 | Fletcher | June 13, 1961 |
| 2,995,319 | Kershner et al. | Aug. 8, 1961 |